March 21, 1961 J. PERRELLI 2,975,812
PITTER FOR REMOVING PITS FROM DRUPE HALVES
Filed Feb. 11, 1957 4 Sheets-Sheet 2
FIG_2
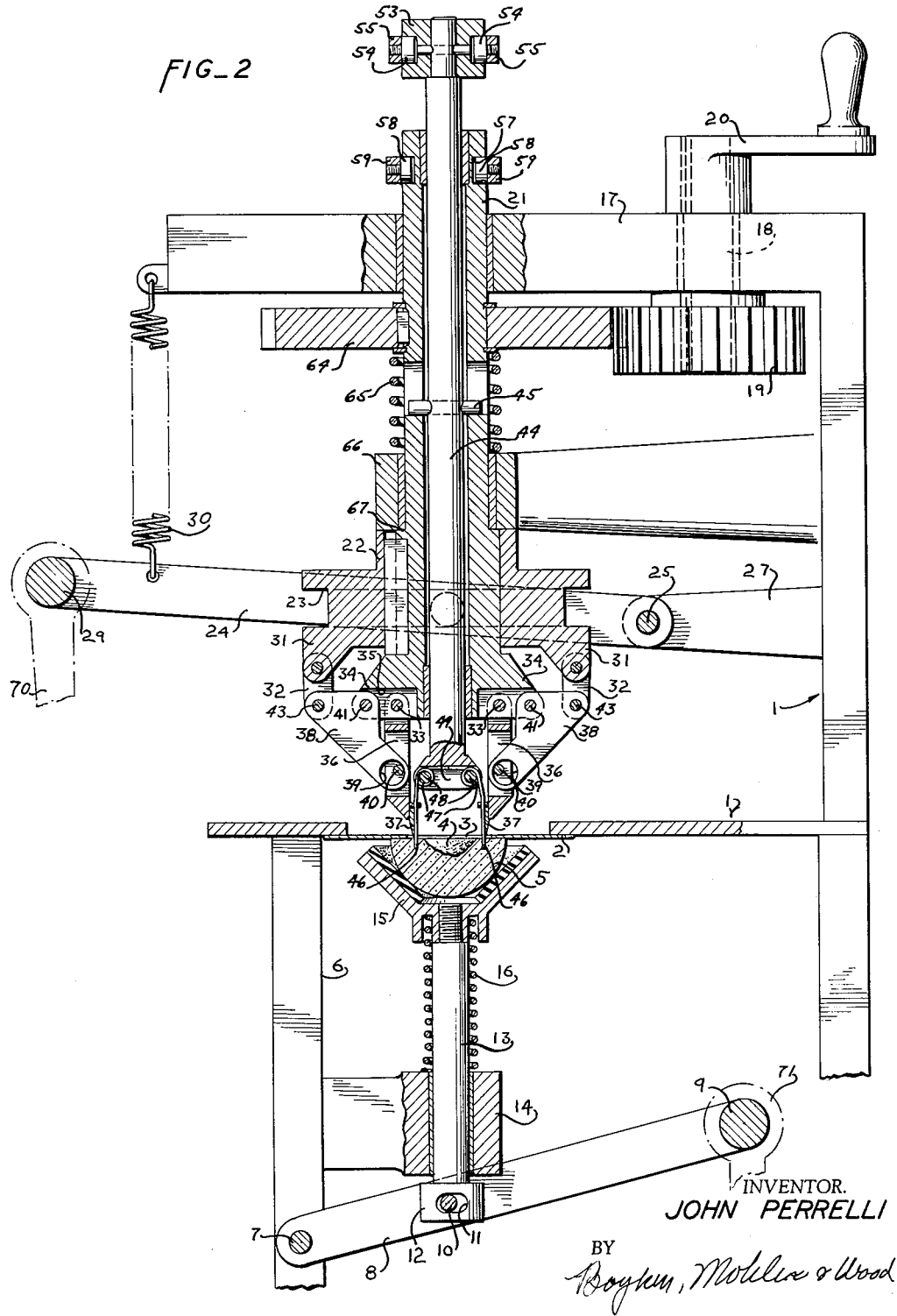
INVENTOR.
JOHN PERRELLI
BY
Boykin, Mohler & Wood
ATTORNEYS March 21, 1961    J. PERRELLI    2,975,812
PITTER FOR REMOVING PITS FROM DRUPE HALVES
Filed Feb. 11, 1957    4 Sheets-Sheet 3
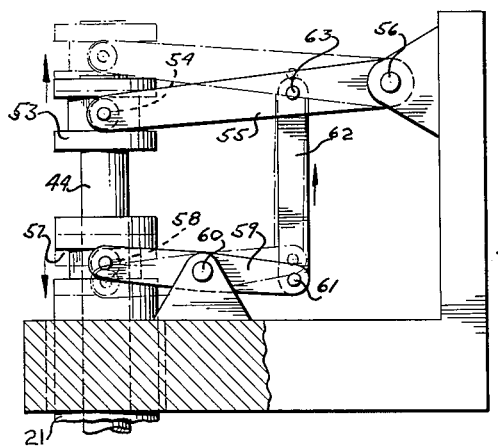
FIG_3
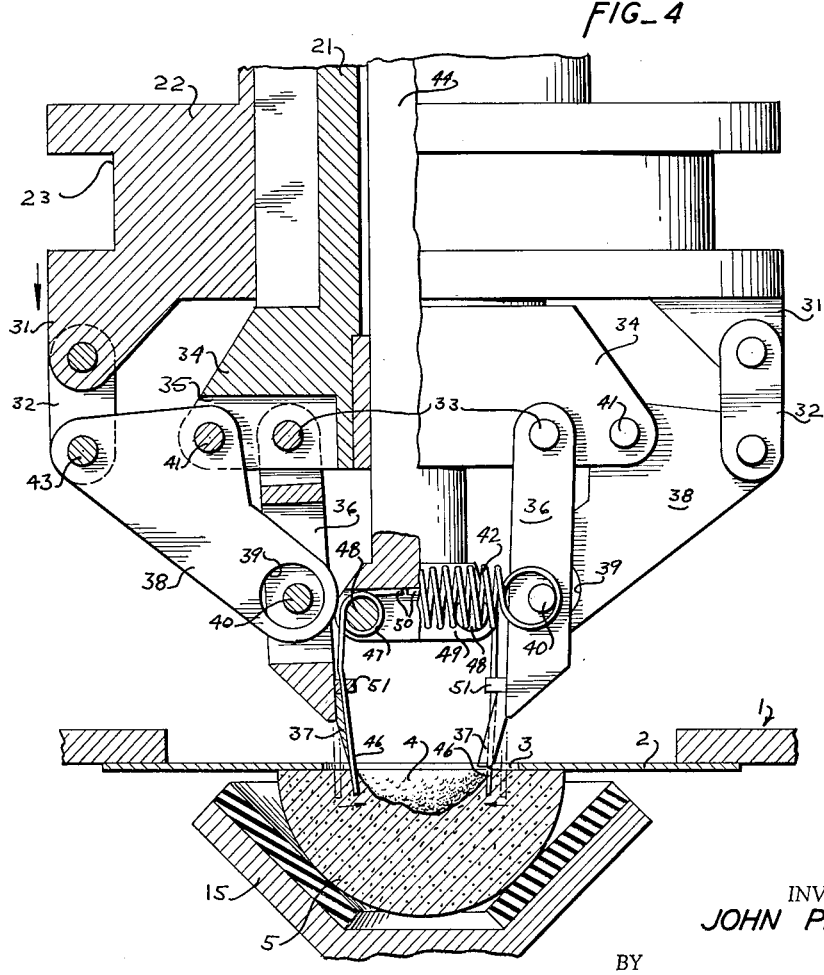
FIG_4
INVENTOR.
JOHN PERRELLI
BY
*Boyken, Mohler & Wood*
ATTORNEYS March 21, 1961      J. PERRELLI      2,975,812
PITTER FOR REMOVING PITS FROM DRUPE HALVES
Filed Feb. 11, 1957      4 Sheets-Sheet 4
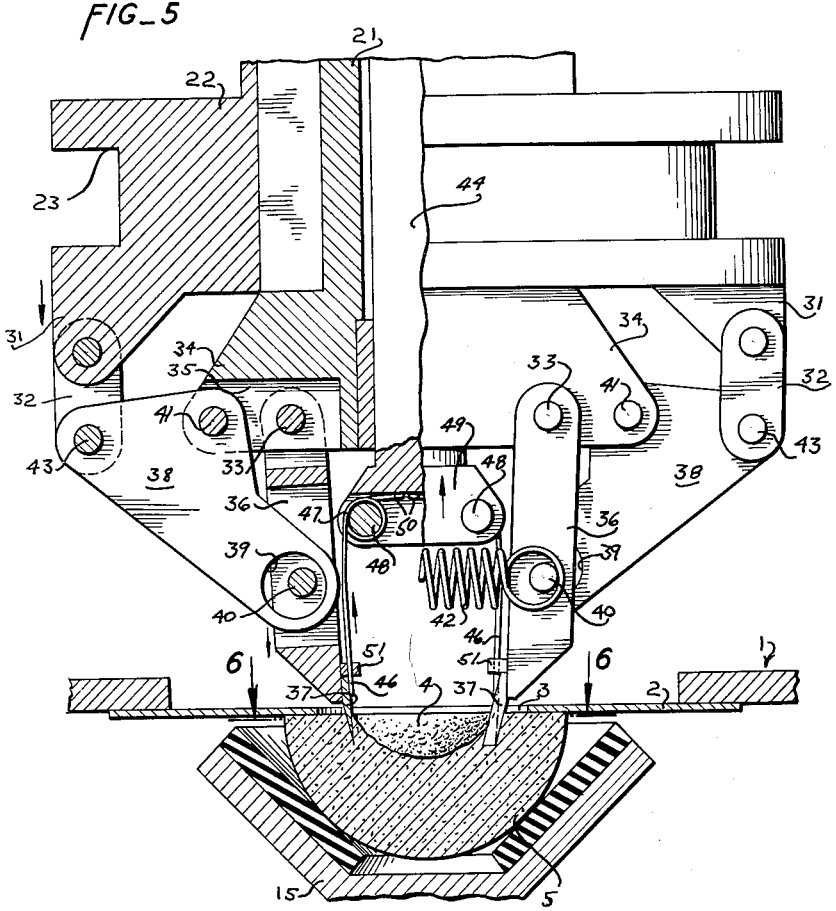
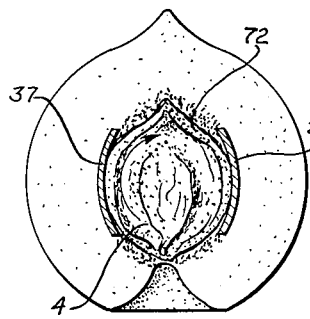
INVENTOR.
JOHN PERRELLI
BY
*Boylan, Mohler & Wood*
ATTORNEYS

# United States Patent Office 2,975,812
Patented Mar. 21, 1961

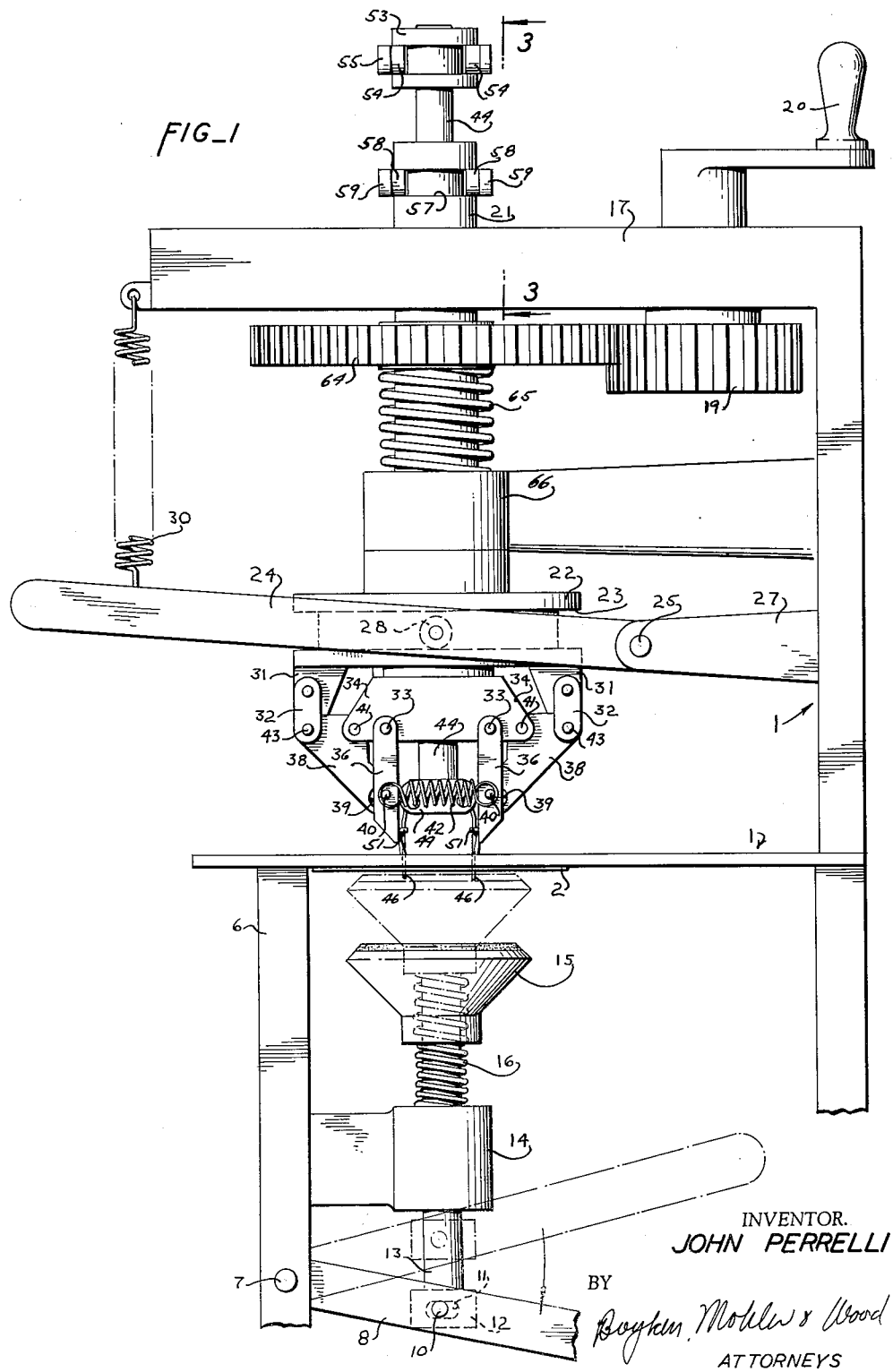

2,975,812

PITTER FOR REMOVING PITS FROM DRUPE HALVES

John Perrelli, Richmond, Calif., assignor to Filper Corporation, Richmond, Calif., a corporation Filed Feb. 11, 1957, Ser. No. 639,336

10 Claims. (Cl. 146—28)

This invention relates to a pitter for removing pits from drupe halves, and has for one of its objects the provision of a pitter that is adapted to automatically position pit gripping means in gripping relation to a half pit that is in a drupe half, and to remove said half pit by effecting relative movement between the body or meat of the drupe half and the pit half therein.

In explanation of the above, the removal of pits from whole drupes by causing relative movement between the flesh of the drupe and the pit, has been done, and also the removal of whole pits from drupe halves by effecting such relative movement is not new. However, there are occasions where drupe halves retain half pits therein and the present invention is adapted to effect the removal of such half pits without loss of flesh, such as occurs where the pits are cut from the flesh.

One of the objects of the present invention is a pitter that will remove pit halves from half bodies of clingstone drupes without injury to the edible flesh of the drupe halves.

Other objects and advantages will appear in the description and in the drawings.

In the drawings,

Fig. 1 is a side elevational view of a pitter illustrative of the invention, the supporting frame and the lever for actuating the drupe holder being broken away to accommodate the view to the sheet.

Fig. 2 is a view similar to that of Fig. 1 except that certain parts are in cross section and the drupe holder is in a position supporting the drupe half with the pit finding or locating means inserted in said drupe half.

Fig. 3 is a sectional view of part of the pitter as seen from line 3—3 of Fig. 1.

Fig. 4 is an enlarged fragmentary sectional view of the pit finding and pit gripping means in a position preparatory to the pit finding means being withdrawn from the drupe half and preparatory to the pit gripping means entering said half.

Fig. 5 is an enlarged sectional view similar to that of Fig. 4, but with the pit gripping means within the body of the half drupe and the pit finding means withdrawn from the half drupe.

Fig. 6 is a sectional view taken along line 6—6 of Fig. 5.

In detail, the pitter illustrated in the drawings comprises a supporting frame generally designated 1, of any suitable character for supporting the parts that make up the pitter. This frame carries a horizontal plate 2 that is formed with an opening 3 (Fig. 2) through which the half pit in a drupe half 5 is adapted to be exposed when the cut face of said drupe half is against the lower side of said plate with the pit half at the opening and exposed through the latter. The plate 2 is preferably relatively thin but with sufficient rigidity to withstand bending under the pressure of the drupe half that is held against the underside.

Secured to the horizontal projection of frame 1 that carries plate 2, is an arm 6 that depends therefrom. A horizontal pivot 7 spaced below plate 2 pivotally connects one of the ends of a pair of lever arms 8 thereto, the opposite ends of said arms being rigidly connected at 9 (Fig. 2). A cross pin 10 extending between said arms at a point intermediate opposite ends of the latter extends through a horizontally elongated slot 11 formed in a head 12 that is rigid with the lower end of a vertically reciprocable shaft 13. By this structure shaft 13 is held against rotation.

Said shaft 13 slidably extends through a bearing 14 carried by arm 6 and said shaft is reciprocable in said bearing.

On the upper end of shaft 13, and rigid therewith, is an upwardly opening conical sided rubber or plastic lined drupe holder 15, the inclined inner surface of which is adapted to engage the convex side of a half drupe 5, and which inclined or tapered inner surface also functions to center the body of the half drupe therein. The liner of the holder may have a friction surface, if desired, to resist slippage of said drupe half relative thereto, for, as will later appear, the pit in said half will be twisted from the half drupe while the latter is held against movement relative to the holder.

A coil spring 16 interposed between the drupe holder 15 and the bearing 14 will yieldably maintain said holder elevated to yieldably hold the cut face of the drupe half tightly against the underside of plate 2. A downward movement of lever 8 will move the holder downwardly to permit positioning a drupe half in the holder and to permit removal of a half from which the pit has been removed.

At a point spaced above the plate 2, the frame 1 projects over said plate as at 17. A vertical bearing in said projection 17 rotatably supports a shaft 18 (Fig. 2) that carries a relatively wide pinion 19 below said projection. A handle 20 above projection 17 is secured to the upper end of shaft 18 for rotating the pinion 19.

Spaced from the shaft 18 and substantially axially aligned over the opening in plate 2 the projection 17 is journalled to reciprocably and rotatably support a hollow shaft 21.

A body 22 is vertically reciprocable on the lower end of the hollow shaft 21, which body is splined to said shaft for rotation therewith. This body 22 is formed with a radially outwardly opening channel 23.

A pair of opposed connected lever arms 24 are pivotally connected at one of their ends by a horizontal pivot 25 to arms 27 that may be part of the frame 1, and which are rigid with the latter. Said lever arms carry opposedly directed pins that, in turn carry rollers 28 (Fig. 1), and which rollers are positioned in the channel 23 in body 22 at opposite sides of the latter.

The outer ends of arms 24 are connected as at 29 (Fig. 2) and a spring 30 connects said arms with projection 17 that is thereabove to yieldably hold the lever arms, and body 22, at the upper end of the vertical movement of both.

Upon swinging arms 24 downwardly the body 22 will be moved downwardly relative to the hollow shaft 21, and as will later appear, this downward movement of said body 22 will result in the actuation of pit finders and even in the eventual downward movement of the shaft 21 itself.

A pair of downwardly projecting ears 31 integral with body 22 are at opposite sides of said body, and a pair of vertically extending links 32 are pivotally connected at their upper ends to said ears, with the links of each pair at opposite sides of each ear.

The lower end of hollow shaft 21 that extends below body 22 is formed with a pair of radially outwardly extending projections 34 at opposite sides thereof. These projections are spaced inwardly from ears 31 but are aligned with the pairs of ears in direction across the axis of shaft 21. The upper corners of thees projections 34 are normally spaced below member 22 when the lever arms 24 are in their upper position (Fig. 2), but these corners and member 22 are adapted to engage when lever arms 24 are moved downwardly (Fig. 5) so as to cause downward movement of the shaft 21, and the ultimate gripping of the pit that is to be removed from the drupe half, as will be later described more in detail, since the pit finders are also removed from the drupe half by reason of the downward movement of shaft 21.

The lower sides of projections 34 are recessed as at 35 (Figs. 2, 4) and the upper ends of a pair of pit gripping members 36 are supported by pivots 33 that extend through the walls defining opposite sides of said recesses 35. The upper ends of said pit gripping members are forked and the projections 34 extend between the forks of each member.

The lower end of each pit gripping member has a relatively thin horizontally curved pit gripping jaw 37 (Fig. 6). The jaws 37 have their concave sides in opposed relation, and the lower edge of each jaw is sharpened to facilitate downward movement of each jaw into the flesh of the drupe half at opposite sides of the pit.

Returning to links 32 that are carried by the ears 31. The lower ends of these links are each pivotally connected at 43 to a modified crank element 38, at a point on said element that would correspond to the outer end of a horizontal arm of a crank with the other arm of the crank extending downwardly and having its lower end positioned directly below recess 35. Thus said lower ends of the downwardly extending arms of crank elements 38 are disposed radially inwardly toward the axis of shaft 21 with respect to the pivots 43.

The lower end of the downwardly extending arm of each crank element 38 is formed with an enlarged circular opening 39 (Figs. 1, 5) through which extends a considerably smaller diameter horizontal pin 40, which pin, in turn is carried by each of the pit gripping members 36.

The juncture of the arms of crank elements 38 extends into the recesses 35 and a horizontal pivot 41 secures each crank element at the juncture between its arms in each recess 35. Each pivot 41 is spaced radially outwardly relative to shaft 21 from each pit gripping member 36.

The pins 40 that extend through the openings 39 in the lower ends of the crank elements 38 project horizontally from opposite sides of each pit gripping member a sufficient distance to enable the projecting ends of the pins on one pit gripping member to be connected by coil springs 42 (Fig. 5) with the projecting ends of the pins on the other member. These springs will constantly tend to yieldably urge the pit gripping members toward each other. However, when the inner side of each opening 39 that is nearest to the axis of shaft 21 is in engagement with the pin 40 therein, the pit gripping members may be held apart against the resistance of springs 42 until the crank elements 38 are swung on pivots 41 so as to enable the pit gripping members to move toward each other. When the body 22 is in its upper position on shaft 21, and before lever 24 is pulled downward, the pit gripping members will be held apart at their widest spacing from each other.

An inner vertical shaft 44 is vertically reciprocable within the hollow shaft 21, which shaft 44 has a cross pin 45 (Fig. 2) extending therethrough and projecting outwardly thereof into vertical slots formed in the hollow shaft 21 at a point spaced above body 22. The pin 45 is at the lowermost ends of said slots at the commencement of a pitting operation and preparatory to the pit being engaged by pit finding elements, and the function of the pin and slot structure is to prevent relative rotation between shafts 21, 44 while permitting relative reciprocable movement.

Carried by the lower end of shaft 44, and vertically slidable along the opposed surfaces of the pit gripping jaws 37 are a pair of vertically elongated pit finding elements 46. Each element 46 is positioned centrally between the side edges of each pit gripping jaw 37, and comprising a spring wire formed with a coil 47 (Fig. 5) at its upper end, which coil extends around a pin 48. Pins 48, in turn, are carried by a head 49 that is rigid with the shaft 44 at its lower end. A leg 50 of said wire extends laterally from each coil 47 to engage the lower surface of the head 49. Thus each pit finding element virtually comprises one leg of a torsion spring, and the spring coil 47 tends to constantly yieldably urge the elements 46 away from each other and against the inner side of each gripping jaw 37. A guide eye 51 carried by each jaw slidably holds each element and the gripping jaw adjacent thereto, together against relative displacement during movement of the jaws about pivots 33 and during relative reciprocable movement between the jaws and elements although the springs 42, 48 will insure yieldable engagement between the jaws and pit finding elements at all times.

The upper end of the shaft 44 projects above the upper end of hollow shaft 21 (Fig. 2) and said upwardly projecting end has a collar 53 secured thereto. This collar is formed with a radially outwardly opening annular groove, or channel, and a pair of rollers 54 is in said channel at opposite sides of the collar.

An arm 55 is pivoted at 56 at one of its ends to a bracket that is rigid with frame 1 (Fig. 3) and the opposite end of said arm is forked to provide extensions projecting to opposite sides of collar 53. One of the rollers 54 is carried at the outer end of each extension.

The upper end of hollow shaft 21 may carry a collar similar to collar 53 or it may be formed with an annular radially outwardly opening groove 57, in which a pair of rollers 58 are positioned at opposite sides of the shaft.

The rollers 58 are carried at one end of a rocking arm 59, said end being forked to provide extensions at opposite sides of the groove in shaft 21 for said rollers. The arm 59 is carried by a pivot 60 at a point intermediate its oppoiste ends, which pivot, in turn, is rigid with frame 1. The end of the rocking arm 59 that is opposite to the forked end thereof, is pivotally connected by a pivot 61 to the lower end of an upwardly extending link 62. The upper end of link 62 is connected by a pivot 63 with arm 55 at a point intermediate rollers 53 and pivot 56.

Secured to the hollow shaft 21 below the frame portion 17, is a gear 64 having its teeth in mesh with the teeth of pinion 19. The substantial width of the pinion enables the teeth on gear 64 to remain fully in mesh with the teeth on the pinion at all times during the reciprocable movement of shaft 21.

A spring 65 is positioned around shaft 21, which spring reacts between gear 64 and a stationary bearing 66. This bearing also is adapted to be engaged by a shoulder 67 on shaft 21, which shoulder is below the bearing, and also an upward extension of body 22 is adapted to engage the bearing. The spring 65 functions to yieldably hold the shaft 21 at the upper end of its movement with the shoulder 67 in engagement with the bearing, and also the bearing functions as a stop for upward movement of the body 21 under the influence of spring 30.

At the commencement of a pitting operation, and when the device is not being operated, the pit finding elements will normally project downwardly through opening 3 a short distance, and the pit gripping jaws 37 will be just above the lower surface of plate 2 as seen in Fig. 2.

In this position, the pit locating elements are spaced apart a greater distance than the maximum distance across a pit, and also a distance that is beyond the range of variation in the position of the pit. Hence when a drupe half is supported in the holder 15 and the latter is moved upwardly under the influence of spring 16 so as to hold the cut face of the drupe half against the underside of plate 2, the pit locating elements 46 will not strike the pit, but will enter the flesh of the drupe half at opposite sides of the pit.

The lever arms 24 as well as lever arms 8 will each be referred to as a lever "arm" since the arms are rigid and act as a single arm.

In operation, the lever arm 8 is swung downwardly away from plate 2 and a drupe half is positioned in the holder 15 with its convex side downward. The lever arm is then released to permit the holder to move upwardly until the cut face of the drupe half engages the plate 2 around opening 3, and the spring 16 will then hold the drupe half against said plate and against rotation of the half relative to the holder 15.

When the cut face of the drupe half 5 is against the lower surface of the plate 2 the pit finders or pit finding elements 46 will have entered the flesh of the drupe endwise so no noticeable rupture of the flesh is apparent, and the pit half 4 will be between the pit finding elements since the spacing of the elements is such as to insure against it striking the pit irrespective of the differences in the diameter of the pit and irrespective of variations in positions of pits within the drupe halves.

The next step in the pitting operation is the downward swinging of the lever 24. The initial downward movement of the lever 24 will result in the body 22 moving downwardly relative to the hollow shaft 21 until the projections 34 are engaged by the body 22. Fig. 4 shows the inner edge of the body 22 at its lower side about to engage the upper outer corner of the projection 34. This relative movement between body 22 and the hollow shaft results in the lower ends of the crank elements 38 swinging inwardly to release the pit clamping members so that springs 42 will be enabled to overcome the tension of the pit finding elements to move the latter into engagement with opposite edges of the pit 4.

Obviously one of the pit finding elements may engage one edge of the pit before the other, but the spring 42 will move such other element into engagement with the other edge of the pit while movement of the first to engage ceases.

Since the pit finding elements are merely wires, they will readily move through the flesh of the drupe half without objectionable mutilation of the flesh. In fact, the result of such movement is not apparent in the cooked fruit.

Since the pit gripping members move with the pit finding elements, said members will be positioned substantially in engagement with the opposite edges of the pit before the relatively thin, sharpened jaws 37 enter the fruit.

It should be noted that the downward movement of body 22 does not cause a downward movement of the hollow shaft 21 until after the pit finding elements have found the pit and are in close engagement with the opposite edges thereof. It is also important to note that the springs 42 operate to force the pit gripping jaws into gripping relation to the fruit. Hence, it is not material whether the pit gripping members engage the pit during the downward movement of the body 22, since the diameter of the openings 39 in the crank elements 38 is such as to insure the members gripping the pit irrespective of variations in the positions of the pits in the drupe halves and irrespective of variations in the diameters of the pits.

When the body 22 engages the projections 34 at the lower end of the hollow shaft 21, further downward movement of the body 22 will cause the shaft 21 to be moved downwardly against the resistance of spring 65, and such downward movement of the shaft 21 will cause the rocking arm 59 at the upper end of shaft 21 to be rocked counterclockwise as seen in Fig. 3. This counterclockwise movement will cause arm 55 and shaft 44 to be moved upwardly, and as the pit finding elements 46 are carried by the lower end of shaft 44, they will be withdrawn from the body of the drupe half and the pit gripping blades or jaws will then tightly grip the pit free from the pit finding elements being positioned between the pit and the jaws. The cross pin 45 may engage the upper end of the slots in shaft 21 to stop relative movement between the shafts 21, 44, at which time the pit finding elements are clear of the drupe half.

The final step in removing the pit will be effected by rotating the pinion 19, which rotation will result in rotation of the shaft 21, body 22 and pit gripping members 38 relative to the pit holder 15, and the pit half will be twisted from the drupe half.

The lever arm 24 may then be released and lever arm 8 swung downwardly, resulting in the drupe half being carried downwardly in the holder for removal, and in the pit being released from the pit gripping members. The cycle may then be repeated.

It is obvious, of course, that links 70, 71 indicated in dot-dash line in Fig. 1 may be connected with the lever arms 24, 25 for connection with any suitable source of power, or with foot actuated means.

Since the present invention is largely employed in the removal of split pits from drupes, as distinguished from pits that have been purposely cut in two, the fact that the pit finders may enter the drupe bodies at points spaced from the edges of the pit halves, and the fact that the clamping jaws may not precisely conform to the curvature of the pit, is immaterial for the reason that in the case of split pits the portion of the flesh along the edges of the pit, as indicated by the numeral 72 (Fig. 6) is usually deteriorated to some degree and should be removed from the flesh. The fact that the blades 37 occupy a space substantially equal to this band of deteriorated meat, and thus remove it from the drupe half upon relative rotation between the jaws and the drupe half, is a desirable result and a desirable step in the method. This deteriorated flesh does not usually extend around the pit but is along the plane of the suture of the pit and pit halves.

Thus none of the flesh of the drupe halves is removed where such flesh adheres to the pit away from the plane of the suture. Only the deteriorated or undesirable flesh is removed.

Any changes and modifications of the example of the invention chosen for the purposes of the disclosure that do not constitute departure from the spirit and scope of the invention are intended to be covered by the claims appended hereto.

I claim:

1. In a pitter for removing a pit half from the pit cavity of the generally hemispherical half body of a bisected drupe having a substantially planar face around said cavity; a drupe holder adapted to engage the convex side of such half body for holding the latter in a predetermined position, pit finding means supported for movement into engagement with opposite edges of such pit half, a support for supporting said drupe holder and said pit finding means in positions relative to each other for movement of said pit finding means into said engagement with said opposite edges of said pit half when said half body is held in said predetermined position by said drupe holder, means connected with said pit finding means for effecting said movement thereof, pit gripping means connected with said pit finding means for movement simultaneously therewith to points adjacent to opposite edges of said pit half, and means connected with said pit gripping means for moving them into gripping relation with said pit half after said pit gripping means is moved to said opposite edges of said pit half, and means operatively associated with said pit gripping means and with said holder for effecting relative movement between said pit gripping means and said holder when said half body is held by said holder and when said pit gripping means is in said pit gripping relation for detaching said pit half from the walls of the pit cavity of said half body.

2. In a pitter for removing a pit half from the pit cavity of the generally hemispherical half body of a bisected drupe having a substantially planar face around said cavity; a drupe holder adapted to engage the convex side of such half body for holding the latter in a predetermined position, pit finding means supported for movement into engagement with opposite edges of such pit half, a support for supporting said drupe holder and said pit finding means in positions relative to each other for movement of said pit finding means into said engagement with said opposite edges of said pit half when said half body is held in said predetermined position by said drupe holder, means connected with said pit finding means for effecting said movement thereof, pit gripping means connected with said pit finding means for movement simultaneously therewith to points adjacent to opposite edges of said pit half, and means connected with said pit gripping means for moving them into gripping relation with said pit half after said pit gripping means is moved to said opposite edges of said pit half, and means operatively associated with said pit gripping means and with said holder for effecting relative movement between said pit gripping means and said holder when said half body is held by said holder and when said pit gripping means is in said pit gripping relation for detaching said pit half from the walls of the pit cavity of said half body, drupe engaging means engaging the planar face of said half body and spaced outwardly of said pit half when said holder holds said half body in said predetermined position, said pit finding means and said pit gripping means being disposed between said drupe engaging means and said half pit.

3. In a pitter for removing a pit half from the pit cavity of the generally hemispherical half body of a bisected drupe having a substantially planar face around said cavity; a drupe holder adapted to support said half body against its convex outer side with said pit half exposed, a pair of spaced pit finding elements, means supporting said pit finding elements outwardly of opposite edges of the pit half in a half body when such body is so supported by said holder and yieldable means connected with said pit finding elements for moving the latter toward each other and into yieldable engagement with said opposite edges of such pit half, pit gripping means connected with said pit finding elements for movement therewith to positions adjacent to said opposite edges of such pit half, said pit gripping means being movable by said yieldable means into pit gripping relation with said opposite edges of said pit half, and means connected with said pit gripping means for moving the latter as a unit relative to said holder in a direction for moving the pit half gripped therebetween relative to the half body held by said holder to release said pit half from said half body.

4. In a pitter for removing a pit half from the pit cavity of the generally hemispherical half body of a bisected drupe having a substantially planar face around said cavity; a drupe holder adapted to support said half body against its convex outer side with said pit half exposed, a pair of spaced pit finding elements, means supporting said pit finding elements outwardly of opposite edges of the pit half in a half body when such body is so supported by said holder and yieldable means connected with said pit finding elements for moving the latter toward each other and into yieldable engagement with said opposite edges of such pit half, pit gripping means connected with said pit finding elements for movement therewith to positions adjacent to said opposite edges of such pit half, said pit gripping means being movable by said yieldable means into pit gripping relation with said opposite edges of said pit half, and means connected with said pit gripping means for moving the latter as a unit relative to said holder in a direction for moving the pit half gripped therebetween relative to the half body held by said holder to release said pit half from said half body, means connected with said pit finding elements for moving them out of pit engaging position at opposite edges of said pit half upon said pit gripping means being in said pit gripping relation at said opposite edges.

5. In a pitter for removing a pit half from the pit cavity of the generally hemispherical half body of a bisected drupe having a substantially planar face around said cavity; a drupe holder adapted to support said half body against its convex outer side with said pit half exposed, a pair of spaced pit finding elements, means supporting said pit finding elements outwardly of opposite edges of the pit half in a half body when such body is so supported by said holder and yieldable means connected with said pit finding elements for moving the latter toward each other and into yieldable engagement with said opposite edges of such pit half, pit gripping means connected with said pit finding elements for movement therewith to positions adjacent to said opposite edges of such pit half, said pit gripping means being movable by said yieldable means into pit gripping relation with said opposite edges of said pit half, and means connected with said pit gripping means for moving the latter as a unit relative to said holder in a direction for moving the pit half gripped therebetween relative to the half body held by said holder to release said pit half from said half body, means connected with said pit finding elements for moving them out of pit engaging position at opposite edges of said pit half upon said pit gripping means being in said pit gripping relation at said opposite edges, said pit finding elements being relatively thin and elongated and being supported for movement transversely of their lengths into said engagement with said opposite edges and longitudinally of their lengths out of said pit engaging position.

6. A pitter for removing a pit half from the pit cavity of the generally hemispherical half body of a bisected drupe having a substantially planar face around said cavity and pit half comprising: a plate having a planar surface against which said planar face is adapted to be held and said plate being apertured to expose said pit half therethrough when said face is so held, a drupe holder adapted to engage the convex side of said half body for holding said face against said planar surface, pit finding means extending through said aperture adjacent to opposite edges thereof for extending into such half body at points outwardly of opposite edges of a pit half when such half body is so held by said holder against said plate with its pit so exposed through said aperture, means connected with said pit finding means for moving them toward each other and into engagement with said opposite edges of such pit half, means connected with said pit finding means for moving them out of engaging relation with said pit half in a direction transversely of the plane of said surface after said pit finding means has been moved to said pit engaging position, pit gripping means connected with said pit finding means for movement therewith to positions adjacent to said opposite edges of said pit half, and means connected with said pit gripping means for moving the latter transversely of said plane of said surface and through said aperture to positions extending across said opposite edges of said pit half upon said movement of said pit finding means out of pit engaging relation, and means connected with said pit gripping means for moving said pit gripping means into pit gripping relation with said opposite edges of said pit after said pit gripping means has been moved to said positions extending across the edges of said pit half.

7. In a pitter for removing a half pit from the pit cavity of the body of a half drupe; a pair of spaced opposed pit gripping means supported for movement toward each other for gripping the half pit in such drupe half when said half pit is positioned between them, a pair of spaced pit finding means supported for movement to positions spaced at opposite sides of such half pit, means connecting said pit finding means and said pit gripping means for movement of said pit finding means toward each other and into engagement with opposite sides of said pit simultaneously with movement of said pit gripping means toward each other and means connected with said pit gripping means and with said pit finding means for effecting movement of said pit finding means to positions out of engagement with said pit and for movement of said pit gripping means into engagement with said opposite sides of said pit in succession upon said pit finding means being moved into engagement with the opposite sides of said pit.

8. In a pitter for removing the pit from the pit cavity of a half drupe and which pitter includes a frame, a support on said frame for holding such half drupe in a predetermined position; a pair of spaced pit gripping means supported adjacent to said support for movement from positions out of such half drupe to positions within said half drupe at opposite sides of the pit in the latter and into gripping engagement with such pit at said opposite sides of such pit, pit finding means carried by said frame and supported for movement into engagement with said opposite sides of such pit when the drupe half with said pit therein is in said predetermined position, and means operatively connecting said pit gripping means with said pit finding means for successive movement of said pit finding means and said pit gripping means into said engagement with said opposite sides of such pit and for movement of said pit finding means out of said drupe half upon movement of said pit gripping means into gripping relation with said pit.

9. In a pitter for removing the pit from the pit cavity of the body of a half drupe and which pitter includes a support for holding such half drupe in a predetermined position; a pair of spaced, yieldable, pit finding means and means supporting said pit finding means spaced at opposite sides of a pit in a half drupe held by said support in said predetermined position and for movement of said pit finding means toward each other and into yieldable engagement with said opposite sides of said pit, pit gripping means respectively connected with said pit finding means for movement simultaneously therewith and for movement into gripping relation with said pit at opposite sides of the latter, means operatively connected with said pit finding means for moving said pit finding means into said engagement with said opposite sides of said pit and for moving said pit finding means and said pit gripping means, respectively, out of and into engagement with said opposite sides of said pit in succession, following the movement of said pit finding means into said engagement with said opposite sides of said pit.

10. In a pitter for removing the pit from the pit cavity of the body of a half drupe and which pitter includes a support for holding such half drupe in a predetermined position; a pair of spaced, yieldable, pit finding means and means supporting said pit finding means spaced at opposite sides of a pit in a half drupe held by said support in said predetermined position and for movement of said pit finding means toward each other and into yieldable engagement with said opposite sides of said pit, pit gripping means respectively connected with said pit finding means for movement simultaneously therewith and for movement into gripping relation with said pit at opposite sides of the latter, and means connected with said pit finding means for moving said pit finding means relative to said pit gripping means and out of engagement with such pit, and means connected with said pit gripping means for moving said pit gripping means into said gripping relation with said pit only after said pit finding means has been so moved out of engagement with said pit.

References Cited in the file of this patent

UNITED STATES PATENTS

| | | |
|---|---|---|
| 666,701 | Scheidler et al. | Jan. 29, 1901 |
| 2,185,090 | Millen | Dec. 26, 1939 |
| 2,255,533 | Ridley | Sept. 9, 1941 |
| 2,407,126 | Ashlock | Sept. 3, 1946 |
| 2,652,872 | Keesling | Sept. 22, 1953 |
| 2,664,127 | Perrelli | Dec. 29, 1953 |
| 2,673,583 | Skog | Mar. 30, 1954 |
| 2,818,098 | Perrelli | Dec. 31, 1957 |